US010545879B2

(12) United States Patent
Bryant et al.

(10) Patent No.: US 10,545,879 B2
(45) Date of Patent: Jan. 28, 2020

(54) APPARATUS AND METHOD FOR HANDLING ACCESS REQUESTS

(71) Applicant: Arm Limited, Cambridge (GB)

(72) Inventors: Richard F. Bryant, Chandler, AZ (US); Kim Richard Schuttenberg, Gilbert, AZ (US); David Madsen, Chandler, AZ (US); Lalit Bansal, Scottsdale, AZ (US); Sriram Samynathan, Chandler, AZ (US)

(73) Assignee: Arm Limited, Cambridge (GB)

( * ) Notice: Subject to any disclaimer, the term of this patent is extended or adjusted under 35 U.S.C. 154(b) by 122 days.

(21) Appl. No.: 15/935,203

(22) Filed: Mar. 26, 2018

(65) Prior Publication Data

US 2019/0294554 A1 Sep. 26, 2019

(51) Int. Cl.
*G06F 12/08* (2016.01)
*G06F 12/1036* (2016.01)
(Continued)

(52) U.S. Cl.
CPC ...... *G06F 12/1036* (2013.01); *G06F 12/0815* (2013.01); *G06F 12/0846* (2013.01);
(Continued)

(58) Field of Classification Search
CPC ............. G06F 12/1054; G06F 12/0864; G06F 12/1063; G06F 12/1027; G06F 12/084;
(Continued)

(56) References Cited

U.S. PATENT DOCUMENTS 9,842,051 B1 * 12/2017 Schuttenberg ...... G06F 12/0833
9,934,152 B1 * 4/2018 Bryant ................ G06F 12/0895

2013/0185520 A1 * 7/2013 Dieffenderfer ...... G06F 12/1063
711/144

* cited by examiner

*Primary Examiner* — Reginald G Bragdon
*Assistant Examiner* — Thanh D Vo
(74) *Attorney, Agent, or Firm* — Nixon & Vanderhye P.C.

(57) ABSTRACT

An apparatus and method are provided for handling access requests. The apparatus has processing circuitry for processing a plurality of program threads to perform data processing operations on data, where the operations identify the data using virtual addresses, and the virtual addresses are mapped to physical addresses within a memory system. The cache storage has a plurality of cache entries to store data, an aliasing condition existing when multiple virtual addresses map to the same physical address, and allocation of data into the cache storage being constrained to prevent multiple cache entries of the cache storage simultaneously storing data for the same physical address. Cache access circuitry is then responsive to an access request specifying a virtual address, to utilise a cache index at least partially determined from the specified virtual address to identify at least one cache entry within the cache storage, and to detect whether a hit is present within the at least one cache entry by comparing a physical address portion associated with that cache entry with a tag portion of the physical address corresponding to the specified virtual address. Remap handling circuitry is then arranged whilst a first program thread is in the process of performing an exclusive operation using a first virtual address to identify a specified physical address whose data is stored in the cache storage, to detect a remap condition when a second program thread issues a second program thread access request of at least one type that specifies a second virtual address that exhibits the aliasing condition with the first virtual address. In the presence of the remap condition, the remap handling circuitry remaps the cache index at least partially determined from the second virtual address, so that the remapped cache index as then used by the cache access circuitry matches the cache index at least partially determined from the first virtual address. This provides an effective mechanism for avoiding potential live-lock scenarios that can otherwise arise.

23 Claims, 12 Drawing Sheets

(51) Int. Cl.
*G06F 12/109* (2016.01)
*G06F 12/1045* (2016.01)
*G06F 12/0815* (2016.01)
*G06F 12/0846* (2016.01)

(52) U.S. Cl.
CPC ........ *G06F 12/109* (2013.01); *G06F 12/1054* (2013.01); *G06F 12/1063* (2013.01); *G06F 2212/1021* (2013.01); *G06F 2212/655* (2013.01); *G06F 2212/657* (2013.01)

(58) Field of Classification Search
CPC ............. G06F 12/0846; G06F 12/0891; G06F 12/0895; G06F 12/10; G06F 2212/608
See application file for complete search history.

REMAP TRIGGERS

EXCLUSIVE MONITOR ENTRY

| THREAD ID | VALID | PHYSICAL ADDRESS PORTION | VA INDEX PORTION |
|---|---|---|---|
| 0 | 1 | A | X |

↗ 500

CURRENT ACCESS REQUEST IN TRACKING CIRCUITRY

| THREAD ID | PA PORTION | VA INDEX PORTION | REMAPPED VA INDEX PORTION | LOAD EXCLUSIVE |
|---|---|---|---|---|
| 1 | A | Y | EMPTY (OR Y) | DON'T CARE |

↗ 505

AS PA PORTION "A" MATCHES WITH SET EXCLUSIVE MONITOR ENTRY, CREATE REMAPPED VA INDEX AND UPDATE TRACKING CIRCUITRY ENTRY

| THREAD ID | PA PORTION | VA INDEX PORTION | REMAPPED VA INDEX PORTION | LOAD EXCLUSIVE |
|---|---|---|---|---|
| 1 | A | Y | X | DON'T CARE |

REMAP TRIGGERS

EARLIER TRACKING ENTRY

| THREAD ID | PHYSICAL ADDRESS PORTION | VA INDEX PORTION | REMAPPED VA INDEX PORTION | LOAD EXCLUSIVE |
|---|---|---|---|---|
| 0 | A | X | X | 1 |

↙ 515

LATER TRACKING ENTRY (INITIAL FORM)

| THREAD ID | PA PORTION | VA INDEX PORTION | REMAPPED VA INDEX PORTION | LOAD EXCLUSIVE |
|---|---|---|---|---|
| 1 | A | Y | Y | DON'T CARE |

↙ 520

LATER TRACKING ENTRY (AFTER REMAP BASED ON EARLIER TRACKING ENTRY)

| THREAD ID | PA PORTION | VA INDEX PORTION | REMAPPED VA INDEX PORTION | LOAD EXCLUSIVE |
|---|---|---|---|---|
| 1 | A | Y | X | DON'T CARE |

REMAP TRIGGER

EARLIER TRACKING ENTRY

| THREAD ID | PA PORTION | VA INDEX PORTION | REMAPPED VA INDEX PORTION | LOAD EXCLUSIVE |
|---|---|---|---|---|
| 0 | A | X | Y | 0 |

⟵ 530

LATER TRACKING ENTRY (INITIAL FORM)

| THREAD ID | PA PORTION | VA INDEX PORTION | REMAPPED VA INDEX PORTION | LOAD EXCLUSIVE |
|---|---|---|---|---|
| 1 | A | Z | Z | DON'T CARE |

⟵ 535

LATER TRACKING ENTRY (AFTER REMAP BASED ON EARLIER TRACKING ENTRY)

| THREAD ID | PA PORTION | VA INDEX PORTION | REMAPPED VA INDEX PORTION | LOAD EXCLUSIVE |
|---|---|---|---|---|
| 1 | A | Z | Y | DON'T CARE |

APPARATUS AND METHOD FOR HANDLING ACCESS REQUESTS

BACKGROUND

The present technique relates to an apparatus and method for handling access requests.

Processing circuitry can be arranged to perform data processing operations on data, where the operations identify the data using virtual addresses, and the virtual addresses are mapped to physical addresses within a memory system. Within such a system, a cache may arranged as a virtually indexed physically tagged (VIPT) cache, where a cache index is derived at least partially from a specified virtual address in order to identify at least one cache entry within the cache (for example to identify a set within a set associative cache), and then the detection of whether a hit is present is determined by comparing a physical address portion stored in the relevant cache entry with a tag portion of the physical address that corresponds to the specified virtual address. Within such a cache, an aliasing condition can arise when multiple virtual addresses map to the same physical address, and the cache can be configured so as to prevent multiple cache entries simultaneously storing data for the same physical address.

Whilst such an approach can effectively deal with the aliasing condition, when the processing circuitry is executing multiple program threads and one or more of the program threads can perform exclusive operations, this can give rise to live-lock issues arising. In particular, for an exclusive operation to complete, it may be required that the data being processed by that exclusive operation remains within the cache throughout performance of the exclusive operation, but the steps taken by the cache to prevent multiple cache entries simultaneously storing data for the same physical address can cause the data to be evicted when different threads are seeking to access the same data, thus preventing the exclusive operation from completing.

It would be desirable to provide an effective mechanism for avoiding such a live-lock scenario arising.

SUMMARY

In one example configuration, there is provided an apparatus comprising: processing circuitry to process a plurality of program threads to perform data processing operations on data, the operations identifying the data using virtual addresses, and the virtual addresses being mapped to physical addresses within a memory system; a cache storage having a plurality of cache entries to store data, an aliasing condition existing when multiple virtual addresses map to the same physical address, and allocation of data into the cache storage being constrained to prevent multiple cache entries of the cache storage simultaneously storing data for the same physical address; cache access circuitry, responsive to an access request specifying a virtual address, to utilise a cache index at least partially determined from the specified virtual address to identify at least one cache entry within the cache storage, and to detect whether a hit is present within said at least one cache entry by comparing a physical address portion associated with that cache entry with a tag portion of the physical address corresponding to the specified virtual address; and remap handling circuitry, whilst a first program thread is in the process of performing an exclusive operation using a first virtual address to identify a specified physical address whose data is stored in the cache storage, to detect a remap condition when a second program thread issues a second program thread access request of at least one type that specifies a second virtual address that exhibits the aliasing condition with the first virtual address, and in the presence of the remap condition to remap the cache index at least partially determined from the second virtual address, so that the remapped cache index as then used by the cache access circuitry matches the cache index at least partially determined from the first virtual address.

In a further example configuration, there is provided a method of handling access requests in an apparatus comprising: employing processing circuitry to process a plurality of program threads to perform data processing operations on data, the operations identifying the data using virtual addresses, and the virtual addresses being mapped to physical addresses within a memory system; providing a cache storage having a plurality of cache entries to store data, an aliasing condition existing when multiple virtual addresses map to the same physical address, and allocation of data into the cache storage being constrained to prevent multiple cache entries of the cache storage simultaneously storing data for the same physical address; responsive to an access request specifying a virtual address, utilising a cache index at least partially determined from the specified virtual address to identify at least one cache entry within the cache storage, and detecting whether a hit is present within said at least one cache entry by comparing a physical address portion associated with that cache entry with a tag portion of the physical address corresponding to the specified virtual address; and whilst a first program thread is in the process of performing an exclusive operation using a first virtual address to identify a specified physical address whose data is stored in the cache storage, detecting a remap condition when a second program thread issues a second program thread access request of at least one type that specifies a second virtual address that exhibits the aliasing condition with the first virtual address; and in the presence of the remap condition, remapping the cache index at least partially determined from the second virtual address, so that the remapped cache index as then used to access the cache storage matches the cache index at least partially determined from the first virtual address.

In a yet further example configuration, there is provided an apparatus comprising: processing means for processing a plurality of program threads to perform data processing operations on data, the operations identifying the data using virtual addresses, and the virtual addresses being mapped to physical addresses within a memory system; cache storage means having a plurality of cache entries for storing data, an aliasing condition existing when multiple virtual addresses map to the same physical address, and allocation of data into the cache storage means being constrained to prevent multiple cache entries of the cache storage means simultaneously storing data for the same physical address; cache access means for utilising, responsive to an access request specifying a virtual address, a cache index at least partially determined from the specified virtual address to identify at least one cache entry within the cache storage means, and for detecting whether a hit is present within said at least one cache entry by comparing a physical address portion associated with that cache entry with a tag portion of the physical address corresponding to the specified virtual address; and remap handling means for detecting a remap condition, whilst a first program thread is in the process of performing an exclusive operation using a first virtual address to identify a specified physical address whose data is stored in the cache storage means, when a second program thread issues a second program thread access request of at least one type that specifies a second virtual address that exhibits the aliasing condition with the first virtual address, and in the presence of the remap condition for remapping the cache index at least partially determined from the second virtual address, so that the remapped cache index as then used by the cache access means matches the cache index at least partially determined from the first virtual address.

BRIEF DESCRIPTION OF THE DRAWINGS

The present technique will be described further, by way of illustration only, with reference to examples thereof as illustrated in the accompanying drawings, in which:

FIGS. 6A to 6C illustrate various remap triggers that may be detected by the remap handling circuitry in one example arrangement;

DESCRIPTION OF EXAMPLES

Figure 1:
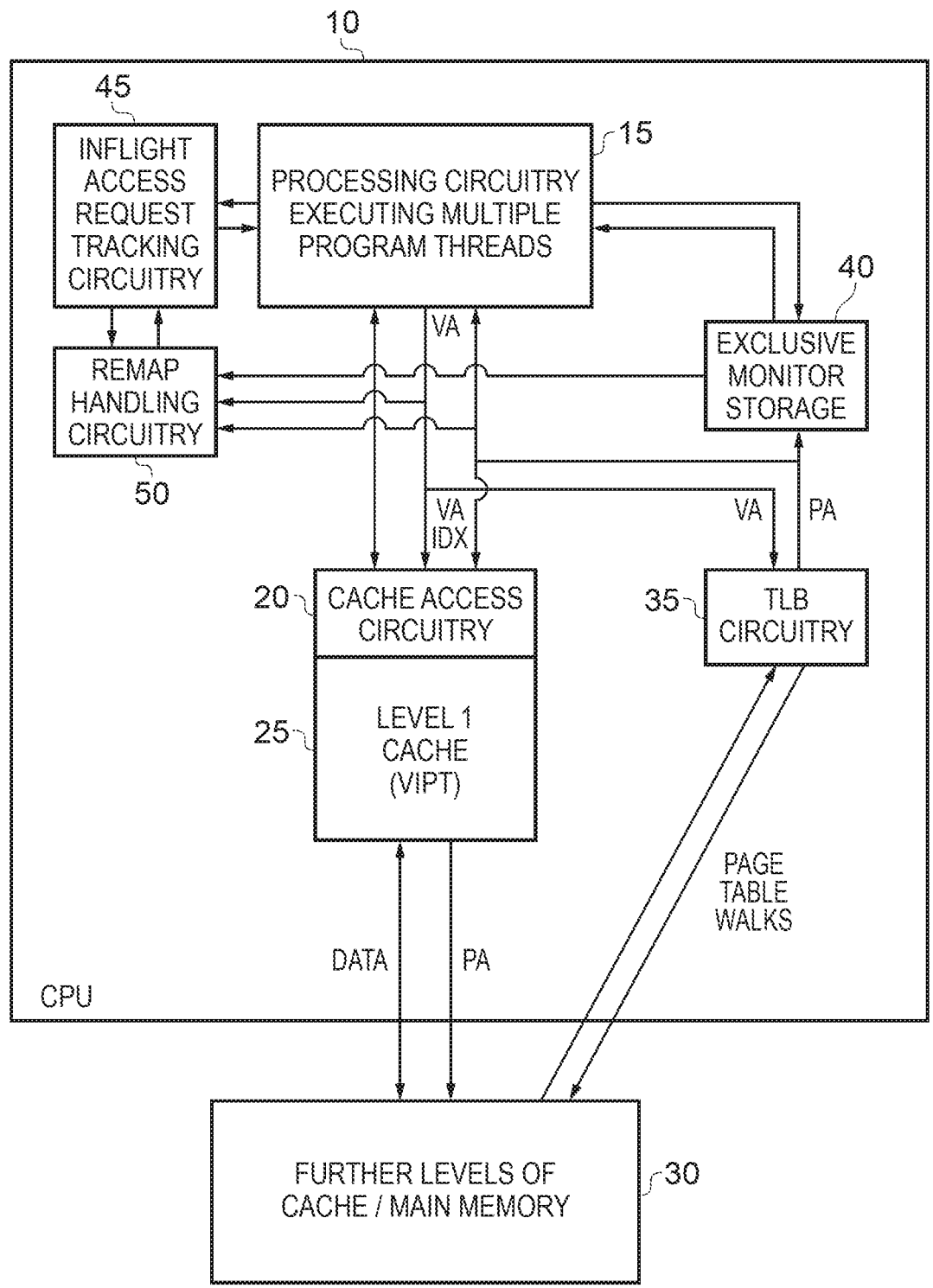
FIG. 1 is a block diagram of a system in accordance with one example arrangement.

In one example configuration, an apparatus is provided that has processing circuitry to process a plurality of program threads to perform data processing operations on data. The operations identify the data using virtual addresses, and the virtual addresses are mapped to physical addresses within a memory system. The apparatus also has a cache storage providing a plurality of cache entries for storing data. An aliasing condition exists when multiple virtual addresses map to the same physical address, and allocation of data into the cache storage is constrained to prevent multiple cache entries of the cache storage simultaneously storing data for the same physical address. In particular, since the cache index used to identify one or more entries within the cache storage that can be used to store the data is usually determined with reference to the virtual address, when two different virtual addresses are used for the same physical address, different entries in the cache storage would be identified dependent on which virtual address is used. The cache storage can be arranged to prevent different entries storing data for the same physical address at any point in time, for example by evicting the contents in one cache entry identified by a first virtual address, when an access is then attempted to another entry using a second virtual address that maps to the same physical address. Once the first entry's contents have been evicted, the entry identified using the second virtual address can then be populated with the data.

Cache access circuitry is arranged to control access to the cache storage, and is responsive to an access request specifying a virtual address, to utilise a cache index at least partially determined from the specified virtual address to identify at least one cache entry within the cache storage. For example, in a set associative cache structure, the cache index will be used to identify a set, comprising one cache entry in each of the ways of the set associative cache. However, it will be appreciated that other forms of cache can be used, and there is no requirement for the cache storage to be arranged as a set associative cache. Once the cache index has been used to identify at least one cache entry, then it is detected whether a hit is present within that at least one cache entry by comparing a physical address portion associated with that cache entry with a tag portion of the physical address corresponding to the specified virtual address.

Often, a cache storage arranged in this way is referred to as a virtually indexed physically tagged (VIPT) cache. One benefit of arranging a cache in that way is that a lookup can begin to be performed within the cache whilst the physical address is still being determined from the specified virtual address. This can provide some performance benefits.

However, when using a cache storage arranged in such a way, this can give rise to problems when different program threads are performing operations where access to the same data may be required, but different virtual addresses are used, in particular in situations where at least one of the program threads wishes to perform exclusive operations. An exclusive operation can take a variety of forms, but is such that for the exclusive operation to complete it is required for the data at the specified physical address to remain within the cache storage throughout performance of the exclusive operation. If a first program thread is performing such an exclusive operation, but a second program thread seeks to access the same physical data using a different virtual address, the earlier-mentioned constraint placed on the cache will cause the first thread's data to be evicted, hence preventing the exclusive operation from completing.

Whilst this might be the correct behaviour if the second program thread is performing a store operation and hence is updating that data, such a scenario will also arise even if the second program thread is only seeking to load the data, i.e. perform a read of the current data, and hence is not modifying that data at that point. However, due to the constraint placed on the VIPT cache structure in order to deal with the aliasing condition, the cache entry within the cache storing the data for the first program thread will be evicted when the second program thread performs the load operation, thereby preventing the exclusive operation from completing.

This can give rise to live-lock situations in a variety of instances, for example where the second thread is also seeking to perform an exclusive operation. Neither thread is able in that instance to complete the exclusive operation that is required, and thrashing occurs within the cache, with each thread's data being evicted, in order to allow the other thread to populate a different entry in the cache with that data, based on the virtual address being used by that other thread.

In order to deal with this issue, the apparatus of the examples discussed herein includes remap handling circuitry. The remap handling circuitry is arranged, whilst the first program thread is in the process of performing an exclusive operation using a first virtual address to identify a specified physical address whose data is stored in the cache storage, to detect a remap condition when a second program thread issues a second program thread access request of at least one type and that specifies a second virtual address that exhibits the aliasing condition with the first virtual address. In the presence of the remap condition, the remap handling circuitry then remaps the cache index at least partially determined from the second virtual address, so that the remapped cache index as then used by the cache access circuitry matches the cache index at least partially determined from the first virtual address. This hence forces both of the program threads to use the same cache index, and avoids one thread's copy of the data being evicted to allow the other thread's copy of that data to be provided within the cache storage (since they both then share the same cache entry).

At least in the situation where the second program thread access request is seeking to perform a load operation, and hence is merely reading the data, this will ensure that the first program thread can continue performing the exclusive operation, since the data will remain stored in the cache storage throughout the exclusive operation, and in particular will not be evicted by virtue of the load access request being performed by the second program thread.

Whilst in one example arrangement, the processing circuitry may be a single device such as a central processing unit (CPU) that is used to execute multiple program threads, in another example arrangement the processing circuitry may take the form of separate devices, for example multiple CPUs, where each CPU executes one of the program threads, and where the cache storage is a shared cache shared by those multiple CPUs.

There are a number of ways in which the performance of an exclusive operation can be tracked within the apparatus. In one example arrangement the apparatus further comprises exclusive monitor storage circuitry having at least one monitor entry for each program thread that is able to perform exclusive operations, where a monitor entry is set for a program thread to identify when that program thread has an exclusive operation ongoing for a specified physical address identified by that monitor entry, and is cleared when the exclusive operation is completed or the data for the specified physical address is evicted from the cache storage.

The monitor storage circuitry may be able to provide multiple entries for each program thread, so that exclusive operations can be performed in respect of multiple physical addresses, or alternatively there may be a single entry for each program thread, such that one program thread can only perform one exclusive operation at a time.

When using such exclusive monitor storage circuitry, the generation of the remapped cache index by the remap handling circuitry ensures that at least when the second program thread access request specifies a load operation, the cache access circuitry will detect a hit within the cache entry of the cache storage storing the data for the exclusive operation being performed by the first program thread, hence preventing the data in that cache entry being evicted and thus preventing the associated monitor entry being cleared. Hence, the monitor entry remains set, allowing the exclusive operation to continue.

There are a number of ways in which the remap handling circuitry can detect the presence of the remap condition, but in one example the remap handling circuitry detects the remap condition when the exclusive monitor circuitry has a set monitor entry for the first program thread, and the specified physical address identified by that monitor entry is the physical address that the second virtual address maps to. In particular, this indicates that the first program thread does have an exclusive operation in progress, and that the aliasing condition exists in respect of the relevant physical address. The remapping that is then performed by the remap handling circuitry removes this aliasing condition and ensures that the same cache index is used by both program threads.

In one example arrangement, the set monitor entry further provides a cache index indication, and in the presence of the remap condition the remap handling circuitry is arranged to use the cache index indication to remap the cache index at least partially determined from the second virtual address. Hence, information provided within the set monitor entry can be used directly to determine how to remap the cache index.

The cache index indication can take a variety of forms. For example, it may directly identify the entire cache index. However, in an alternative approach, the cache index indication identifies one or more bits of the cache index that differ between virtual addresses exhibiting the aliasing condition. Hence, the portions of the cache index that may be common between the different virtual addresses do not need to be represented directly within the cache index indication, and only the bits that differ need identifying, since with that information the remap handling circuitry can then remap the cache index as required.

There are a number of ways in which the monitor entry may be set and cleared, depending on the type of exclusive operation being performed. In one example arrangement, the monitor entry is set for a program thread in response to processing of a load exclusive access request used to start the exclusive operation, and is cleared in response to processing of a store exclusive access request used to complete the exclusive operation. Hence, in such an arrangement the exclusive operations are defined by pairs of load exclusive access requests and store exclusive access requests.

In one example configuration, the apparatus may further comprise inflight access request tracking circuitry having a tracking entry at least for each load access request that has been issued by the processing circuitry but has not yet completed. Each tracking entry may indicate whether the load access request identified therein is associated with an exclusive operation, and may provide for the identified load access request an indication of the program thread and an indication of the specified physical address identified by the virtual address.

When such inflight access request tracking circuitry is provided, then the remap handling circuitry may also make reference to that tracking circuitry to detect other instances of the remap condition. In particular, it may be the case that one of the program threads is going to perform an exclusive operation, or has started to perform an exclusive operation, but the exclusive monitor storage has not yet been updated to indicate that fact. Nevertheless, that information may still be derived from the contents of the inflight access request tracking circuitry. In particular, the remap handling circuitry may further be arranged to detect the remap condition when the inflight access request tracking circuitry has a tracking entry for the first program thread identifying that the load access request identified therein is associated with an exclusive operation and for which the specified physical address is the physical address that the second virtual address maps to. Hence, even if the exclusive monitor circuitry has not yet been set, this indicates the situation where the exclusive monitor will be set, and accordingly it is still useful to remap the cache index for the second program thread access request.

There are a number of ways in which the remap handling circuitry can determine how to remap the cache index in such a situation. In one example, the tracking entry further provides a cache index indication for the virtual address specified by the load access request, and in the presence of the remap condition the remap handling circuitry is arranged to use the cache index indication to remap the cache index at least partially determined from the second virtual address.

As with the cache index indication that may be provided within the exclusive monitor storage circuitry, the cache index indication within a tracking entry can take a variety of forms, and may for example indicate the entire cache index. However, alternatively the cache index indication identifies one or more bits of the cache index that differ between virtual addresses exhibiting the aliasing condition. This provides sufficient information to enable the remap handling circuitry to determine how to remap the cache index.

In one example arrangement, each tracking entry further comprises a remap field to identify when the cache index has been remapped for the access request being tracked by that entry. The remap field can take a variety of forms. For example, it can be a single bit field that is set to identify when the cache index has been remapped and is cleared when the cache index has not been remapped. However, alternatively, or in addition, the remap field may include a remapped cache index indication, with a separate field being provided to identify the original cache index indication. In such situations, the earlier-mentioned single bit field may or may not be used. However, in principle it is not required, as the presence of remapping can be determined from comparing the cache index in the original cache index field with the cache index in the remap field.

When the tracking entries include such a remap field, the remap handling circuitry may also detect another scenario where the remap condition exists. In particular, the remap handling circuitry may further be arranged to detect the remap condition when the inflight access request tracking circuitry has a tracking entry for the first program thread whose remap field identifies that the cache index has been remapped for the access request being tracked by that entry and for which the specified physical address is the physical address that the second virtual address maps to. In particular, the presence of the tracking entry for the first program thread whose remap field identifies that the cache index has been remapped indicates that at some point in time there was an exclusive operation being performed by the first program thread, and accordingly this can be used to trigger remapping of the cache index for the second program thread access request.

The types of second program thread access request that are remapped can take a variety of forms, but in one example said at least one type of second program thread access request that the remap handling circuitry is arranged to detect the remap condition for comprises at least load access requests. As mentioned earlier, it is the load access requests that do not require the exclusive operation of the first program thread to be terminated, and hence by remapping the cache index so that a hit occurs, thereby avoiding the need to evict the first program thread's cache entry, this ensures that the exclusive operation of the first program thread can continue.

However, if desired, said at least one type of second program thread access request that the remap handling circuitry is arranged to detect the remap condition for may further comprise store access requests. Whilst remapping in respect of store access requests is not strictly needed in order to address the exclusive operation issue, since if the second program thread performs a store operation in respect of the physical address, the first program thread's exclusive operation should terminate, it can give rise to some performance benefits. Further, it avoids the need to seek to distinguish between load access requests and store access requests. The performance benefits can arise by virtue of the fact that the remapping will cause a hit to be identified within the cache storage, hence preventing an eviction and a subsequent linefill in order to process the store request. Hence, even though the exclusive operation may be terminated in respect of the first program thread, a performance benefit is still achieved in the handling of the store access request.

When also seeking to remap store access requests, the inflight access request tracking circuitry may also be used to provide tracking entries for each store access request that has been issued by the processing circuitry but has not yet completed. Hence the information in the inflight access request tracking circuitry for store access requests can be updated to reflect any remapping that has taken place.

In addition to seeking to remap the second program thread access request in the presence of the remap condition discussed earlier, the remap handling circuitry may in some example arrangements be further arranged to detect presence of the remap condition when at least one further access request is issued that is associated with a physical address that is identified in a tracking entry of the tracking circuitry. For example, for ease of implementation, it may be desired not to check whether the access request that is a candidate for remapping is actually from a different program thread to the program thread performing the exclusive operation. Performance benefits may still be realised by performing the remapping, even though the remapping is not strictly necessary to deal with the exclusive operation live-lock issue discussed earlier.

In one example scenario, the at least one further access request for which the remap handling circuitry detects presence of the remap condition may comprise a load exclusive access request issued for any of the plurality of program threads. This can give rise to performance benefits, since by remapping an exclusive load operation when there is an older aliased operation, this could avoid an alias conflict at the start of the performance of the exclusive operation, hence avoiding any potential performance impact in the performance of the exclusive operation that would otherwise arise by having to deal with the aliasing condition at the start of the exclusive operation.

There are a number of ways in which the cache index can be determined at least partially from the specified virtual address. For example, in one instance the cache index may be determined directly by a specified number of bits of the virtual address. Alternatively, a part of the cache index may be determined that way, but the one or more bits that may differ dependent on the virtual address can be determined using alternative information, for example thread ID information or the like. Effectively, those bits of the cache index are used to provide a hint as to where within the cache the data should be present. If the data is not found at the cache entry identified by the cache index, but the cache determines that that physical address is present within the cache, then the earlier-mentioned eviction process can be performed to evict the data from the cache entry that does in fact contain the data for that physical address, and to then perform a cache linefill operation to reinstate the data into the cache entry identified by the new cache index.

Whilst, as mentioned earlier, there is no need to remap store access requests in order to deal with the exclusive operation live-lock issue, there can be benefits in certain situations to remapping at least certain types of store access request. For example, in one example implementation, when the second program thread access request is a load exclusive access request, and has its cache index remapped, the remap handling circuitry may be arranged to also associate the same remapped cache index with the corresponding store exclusive access request issued by the second program thread. Hence, the cache index used for the load exclusive access request and its associated exclusive access request can be retained the same, even in the presence of remapping.

One particularly efficient way for performing remapping for store exclusive access requests may be provided by making reference to the earlier-discussed exclusive monitor storage circuitry. In particular, when a store exclusive access request is issued and the associated monitor entry is set in the exclusive monitor storage, a cache index indication within that associated monitor entry may be used to determine the cache index to be provided for the store exclusive access request. Hence, no reference needs to be made to the inflight access request tracking circuitry in such instances, and no specific action is required by the remap handling circuitry, since instead the cache index for the store exclusive access request can be obtained directly from the information provided within the relevant monitor entry of the exclusive monitor storage circuit. This provides a particularly efficient mechanism for ensuring that load exclusive access requests and associated store exclusive access requests use the same cache index.

Particular examples will now be described with reference to the Figures.

FIG. 1 is a block diagram of a system in accordance with one example implementation. In this example a CPU 10 is provided that has processing circuitry 15 for executing multiple program threads. The processing circuitry is arranged to issue access requests to the memory system when seeking to load data values into its internal registers or to store data values from the internal registers back to the memory system. The processing circuitry operates using virtual addresses, and an access request output by the processing circuitry has a virtual address associated therewith. The access request is received by the cache access circuitry 20 associated with the level 1 cache 25. The level 1 cache 25 is arranged as a VIPT cache, and hence a cache index is derived from the virtual address and is used to identify one or more entries within the level 1 cache. In one particular example, the level 1 cache is a set associative cache, and the cache index is used to identify a set within the cache, that set containing one cache entry (also referred to herein as a cache line) for each way of the cache.

Since the level 1 cache is virtually indexed, the cache lookup can begin before the physical address is known. In parallel with that process, the translation lookaside buffer (TLB) circuitry 35 can be used to translate the virtual address in order to produce the corresponding physical address. As is known in the art, this may be achieved by accessing a number of page tables within memory 30, and using the descriptors within those page tables to determine a mapping from the virtual address to the physical address. The physical address as determined by the TLB circuitry can then be returned to the processing circuitry 15, and also forwarded on to the cache access circuitry 20 so that the cache access circuitry can then complete the cache lookup process.

In particular, once a set has been identified using the cache index, then it is determined whether a hit is detected within one of the cache lines of that set by comparing a physical address portion stored in association with that cache line with a tag portion of the physical address produced by the TLB circuitry 35. In the presence of a hit, the access can proceed within the level 1 cache. However, in the event of a miss, the access request can be propagated onto the further levels of cache/main memory 30 in order to cause the required data to be accessed. As part of this process, a linefill operation may occur within the level 1 cache 25 in order to store a cache line's worth of data containing the data being accessed by the access request, so that that data is then available in the level 1 cache for any subsequent access request that also seeks to access the data in that cache line. As shown in FIG. 1, in the example illustrated therein any accesses to the further levels of cache or main memory 30 are performed using the physical address determined by the TLB circuitry 35.

The processing circuitry 15 may also have associated therewith inflight access request tracking circuitry 45 containing one or more tracking entries to keep track of access requests that have been issued by the processing circuitry but have not yet completed. In particular, it is possible for a number of access requests to have been issued, but for the commit stage within the processing circuitry pipeline associated with those access requests not yet to have been reached, and during that period of time those access requests can be tracked within the tracking circuitry 45.

The tracking circuitry can be arranged in a variety of ways, but contains a number of entries, where each entry identifies, for a pending access request, the thread ID of the program thread issuing that access request, and at least a portion of the cache index used to identify a set within the level 1 cache 25. It may also have a field that can be set to identify whether the associated access request is a load exclusive access request, indicating the start of an exclusive operation being performed by the associated program thread. Further, it can have a field to store at least a portion of the physical address determined by the TLB 35 based on the virtual address specified for the access request. As will be discussed in more detail later, one or more further fields can be used to keep track of any remapping performed in respect of the cache index by remap handling circuitry 50.

In the examples discussed herein, it is assumed that at least one of the program threads being executed by the processing circuitry is able to perform exclusive operations. The exclusive operations can be arranged in a variety of ways, but are such that for the exclusive operation to complete, it is required for the data at the specified physical address to remain within the cache storage throughout performance of the exclusive operation. Hence, if any action undertaken by the level 1 cache causes the data to be evicted during the performance of the exclusive operation, the exclusive operation will not complete, and will need to be retried by the program thread.

As mentioned earlier, when using a VIPT cache, it is known to constrain allocation of data into the cache so as to prevent multiple cache lines of the cache simultaneously storing data for the same physical address. Hence, by way of example, if one access request uses a virtual address that points to a particular set within the cache, and a hit is not detected, but some ancillary circuitry associated with the level 1 cache identifies that the data for the relevant physical address is stored within the cache, then this indicates that a different virtual address was used when storing the data in the cache. A lookup can then be performed in the cache to identify the relevant cache line currently storing the data, and to evict the data from that cache line, so as to enable the cache line identified by the new virtual address cache index to then be populated with the required data. Since the data existing in the other cache line has been evicted, this maintains the position that at any point in time only one cache line stores data for a particular physical address.

There are a number of ways in which the cache can keep track of what physical addresses are associated with data stored in the cache. For example, a bloom filter type structure can be used where, for each cache line populated with data, the relevant physical address is passed through the bloom filter in order to cause a counter to be incremented. When data is evicted for a physical address, the corresponding counter is decremented. Hence, if a miss occurs when processing an access request with a particular virtual address/associated cache index, but the bloom filter indicates that the data for the specified physical address is present within the cache, this indicates that the aliasing condition may be present, in that a different virtual address may have been used to previously populate the cache with the data. In that instance, a check can be performed in the cache to see if a cache line does store data for the address in question, and if so the earlier-mentioned eviction and linefill process can be performed in order to repopulate the cache with the data at a cache line identified by the new cache index.

Whilst the above-mentioned process ensures that the aliasing condition is managed appropriately within the cache, it can cause problems when at least one of the threads is seeking to perform an exclusive operation. In particular, the actions of a different thread can cause the data to be evicted from the cache, which in that case will cause the exclusive operation to terminate without completing. The program thread then needs to retry the exclusive operation. However, this can give to rise to live-lock scenarios in certain situations. For example, if two program threads are each seeking to perform exclusive operations, it will be appreciated that such a process may cause neither thread to be able to perform the exclusive operation, since the actions of the other thread cause the data to continually be evicted from the cache, preventing completion of the exclusive operation.

The remap handling circuitry 50 is used to address this issue by remapping the cache index in certain situations, as will be discussed in more detail below. The exclusive monitor storage 40 shown in FIG. 1 is used to keep track of any exclusive operations currently in the process of being performed by any of the threads. At a minimum, the exclusive monitor storage may include a monitor entry for each thread, which is set when that thread starts an exclusive operation, and is cleared when the exclusion operation completes or is terminated. That monitor entry will then identify the physical address associated with that exclusive operation, and the remap handling circuitry 50 has access to the contents of the exclusive monitor storage. The remap handling circuitry also has access to the inflight access request tracking circuitry 45, and based on this information can detect situations where one program thread is performing, or will be performing, an exclusive operation using a first virtual address to identify a specified physical address, but a second program thread is also issuing an access request using a second virtual address that exhibits the aliasing condition with the first virtual address. In the presence of such a condition, referred to herein as a remap condition, the remap handling circuitry will then remap the cache index derived from the second virtual address so that the remapped cache index matches the cache index derived from the first virtual address.

As a result, this enforces the use of the same cache index by both threads in such a situation, ensuring that a hit occurs within the cache. Thus, when the second program thread is performing a load operation, which merely needs to read the value of the data, it will hit in the cache, hence preventing the cache contents being evicted for the first program thread, and hence enabling the first program thread to continue with the exclusive operation.

To ensure that the potential live-lock scenario is avoided when performing exclusive operations, it is sufficient for the remap handling circuitry 50 to only perform remapping in respect of load access requests. In particular, for store access requests, it is appropriate for the exclusive operation of one program thread to be terminated if another program thread is performing a store access. Nevertheless, if desired, the remapping scheme can be extended to such store access requests, since this can give rise to performance benefits, by ensuring that the store access request hits within the cache, rather than misses with the resulting requirement for an eviction and a linefill process to be performed. Even though the exclusive operation of the first program thread will still be terminated, a performance benefit is obtained for the handling of the store access request.

Figure 2A:
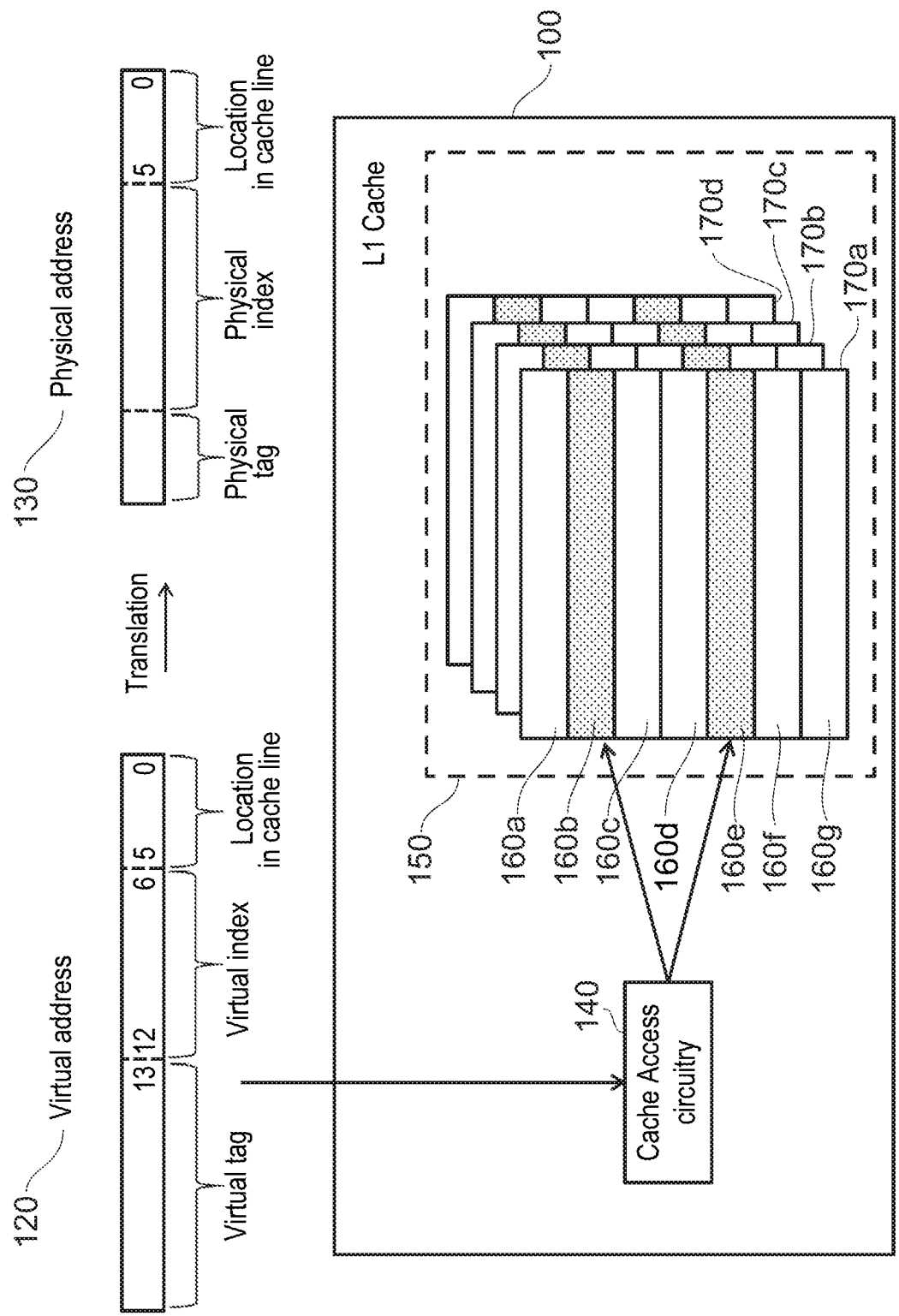
FIGS. 2A and 2B illustrate how an aliasing condition can arise within the cache of FIG. 1.
Figure 2B:
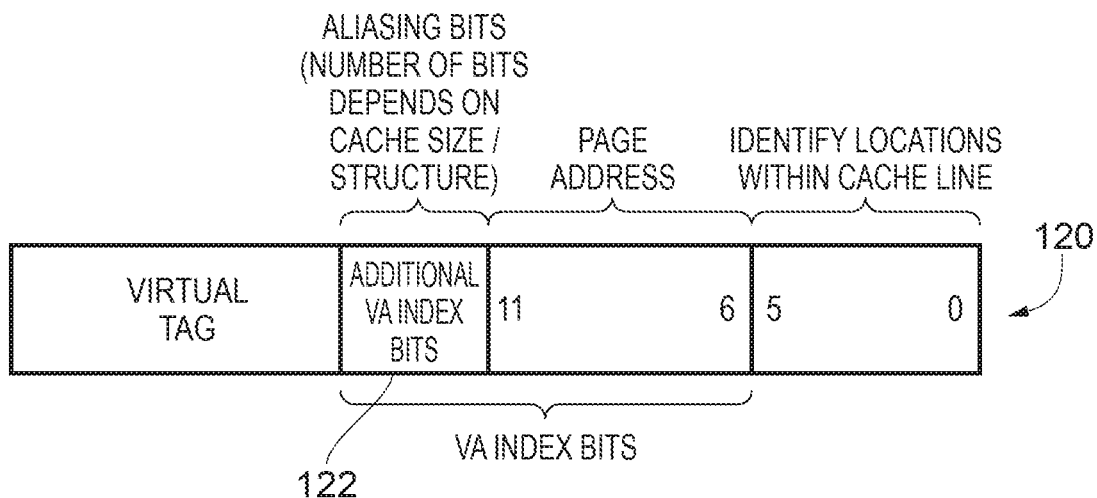

FIGS. 2A and 2B are provided to illustrate the aliasing condition that can arise when two different virtual addresses map to the same physical address. As shown in FIG. 2A, a virtual address 120 may consist of a number of different portions, namely a virtual tag portion, a virtual index portion and a number of least significant bits identifying a particular location within a cache line. When the TLB 35 translates the virtual address, it will create a physical address 130, which may or may not have the same number of bits as the virtual address. In particular, in some examples, it is the case that the virtual address is larger than the physical address, as schematically shown in FIG. 2A. The bits identifying the location within the cache line are unchanged, but by virtue of the translation the physical address 130 is formed by the least significant bits specifying the location in the cache line, along with a physical index portion and a physical tag portion.

FIG. 2B illustrates in more detail fields provided within the virtual index portion of the virtual address 120. In particular, a certain number of bits will identify a page address, in the example of FIG. 2B these being bits 6 to 11. Those bits may actually be replicated within the physical address, so that in this example bits 11 to 0 of the virtual address correspond to bits 11 to 0 of the physical address. However, the virtual index can include a number of additional index bits 122, these bits being referred to as aliasing bits, and the number of bits provided depends on the cache size and its structure.

For example, if one additional bit is provided in field 122, such that the virtual address index bits are formed by bits 12 to 6 of the virtual address in the illustrated example, this enables two aliased locations to be identified within a 32 Kbyte four-way cache, as illustrated schematically in FIG. 2A. In particular, the storage 150 within the level 1 cache 100 may comprise of a number of sets 160a to 160g, where each set includes a plurality of ways 170a to 170d. For ease of illustration, the storage structure 150 does not show separate tag RAMs and data RAMs, but typically there will be a separate tag RAM entry for each cache line in the data RAM, the tag RAM entry identifying physical address bits, valid bits, dirty bits, etc. and the corresponding cache line containing the data. The tag RAMs and data RAMs are accessed in the same way, and in particular the cache access circuitry 140 will use the virtual index derived from the virtual address in order to determine the appropriate set to access (each set containing a cache line in each way, and the corresponding tag RAM entries for those cache lines). In this example, because the virtual address index bits are bits 12 to 6, there are two potential aliased locations, as indicated by the shaded sets 160b and 160e. If instead the virtual index extends from bits 13 down to 6, then there would be four aliased locations in a 64 Kbyte four-way cache.

As mentioned earlier, the cache can be arranged so as to prevent different sets within the cache storing data for the same physical address simultaneously. Hence, if an access request wishes to access data at a specified physical address, and the cache index derived from the virtual address points to set 160b, for which no hit is detected, but the cache determines that the data at that specified address is stored within the cache, then a process can be invoked to evict the data from the set 160e, followed by a linefill operation to repopulate the data within the set 160b, in order to allow the access to proceed. As mentioned earlier, this behaviour of the VIPT cache can cause problems when one or more of the program threads are performing exclusive operations in respect of the data at the specified address, by preventing completion of those exclusive operations.

Figure 3A:
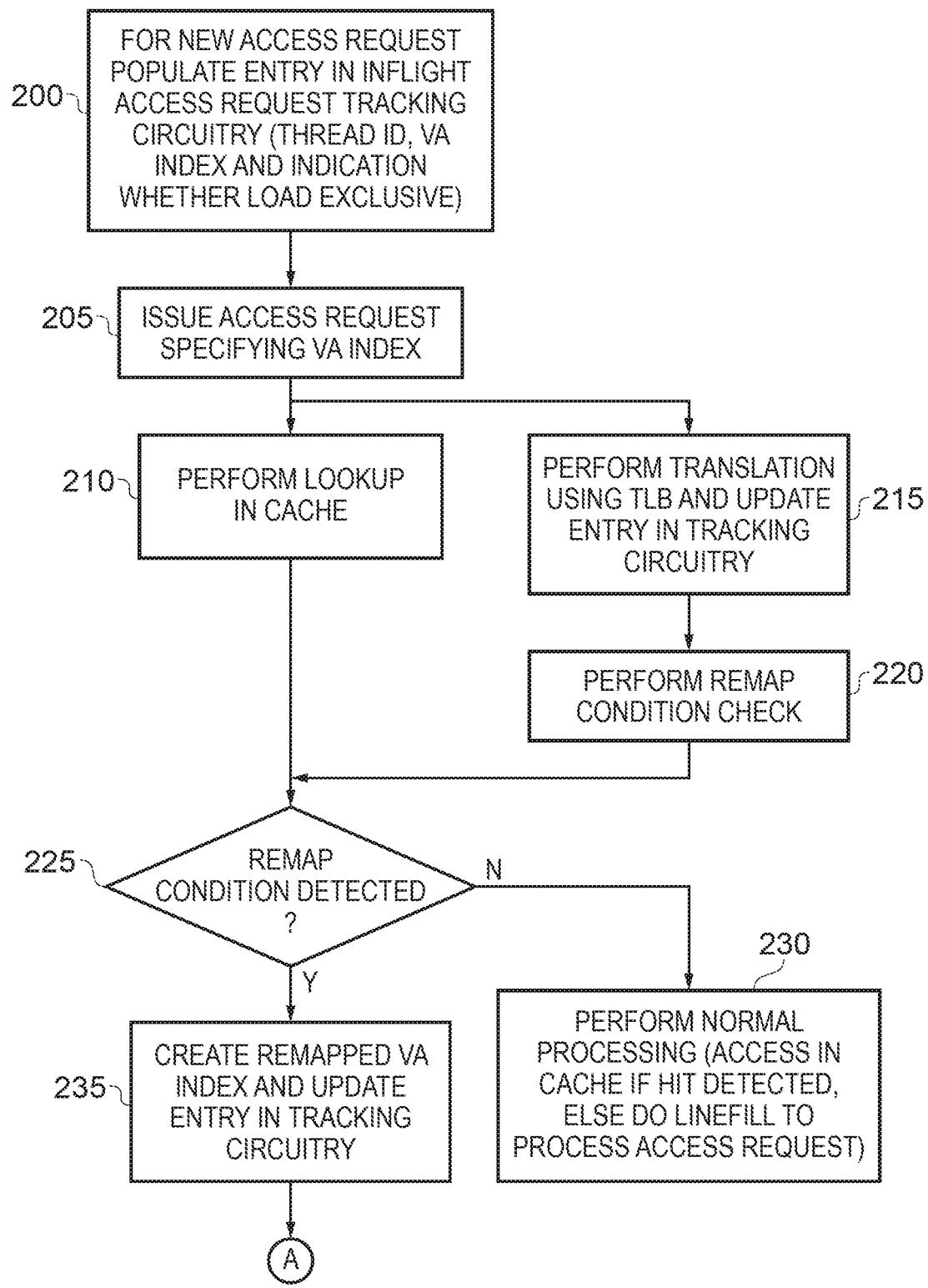
FIGS. 3A and 3B provide a flow diagram illustrating how access requests may be handled in one example arrangement.
Figure 3B:
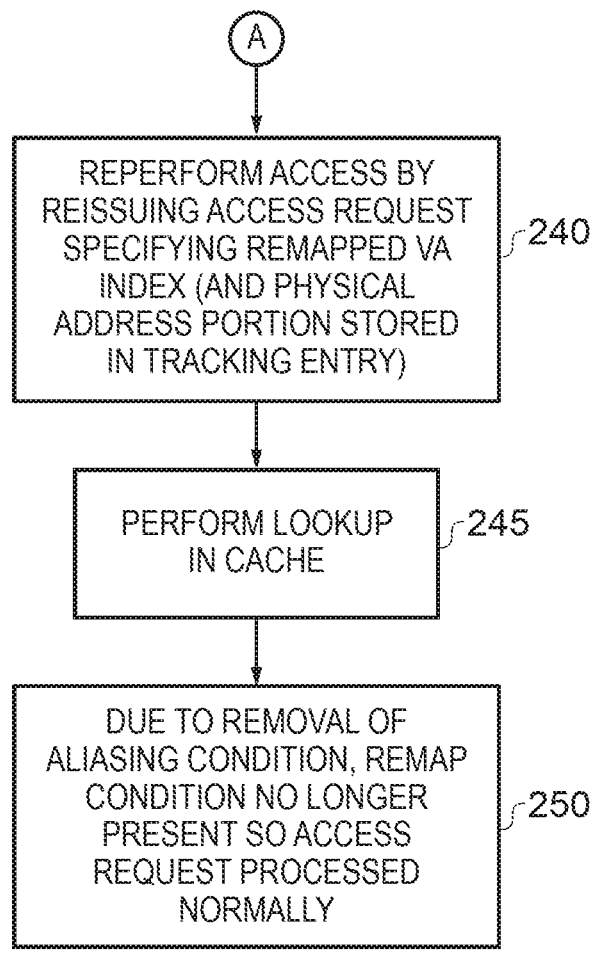

FIGS. 3A and 3B provide a flow diagram illustrating how access requests may be handled in accordance with the apparatus shown in FIG. 1, in order to address such issues. At step 200, when a new access request is to be generated, an entry is populated in the inflight access request tracking circuitry 45, that entry being populated to indicate the thread identifier, the cache index (also referred to herein as the virtual address index), and an indication as to whether the access is a load access or not. At step 205, the access request can then be issued specifying the cache index, whereafter a number of processes are performed in parallel. In particular, the cache begins to perform the lookup at step 210, using the cache index to identify the appropriate set. Meanwhile, in parallel, an address translation can be performed at step 215 using the TLB 35, and when the physical address becomes available, the relevant entry in the tracking circuitry can be updated to identify at least a portion of that physical address. Further, once the physical address is available, a remap condition check can be performed at step 220 by the remap handling circuitry 50. This remap condition check will be discussed later in more detail with reference to FIG. 4, and can be performed in respect of all access requests or just a subset of the access requests. In particular, as mentioned earlier, to deal with the potential live-lock problem for exclusive operations, it is sufficient to perform the remap operation in respect of load access requests, but if desired the scheme can also be extended to store access requests, to enable some performance improvements to be realised.

The process then proceeds to step 225 where it is determined whether the remap condition was detected. If not, then the process can proceed to step 230 where the access request is processed in the normal manner. In particular, now that the physical address is available, the cache can determine whether a hit is present within the identified set, and if so the access can proceed using the hit cache line. Otherwise, in the event of a miss, a linefill operation can be triggered to retrieve the required data from a further level of cache or main memory 30, whereafter the access request can be processed. For a load operation this will involve returning the required data to the processing circuitry, whilst for a store operation this will involve writing the relevant data to the appropriate location within the cache line. Depending on whether the address is associated with a write through or writeback region, any update to the contents in the cache line may also be replicated at the same time within main memory (for a write through region), or instead a dirty bit may be set to identify that the data is more up to date than the contents in main memory (for a write back region).

However, if the remap condition is detected, the access request does not continue at this point, and instead a remapped cache index is created by the remap handling circuitry at step 235, and the entry in the tracking circuitry is updated to capture that remapped cache index. The process then proceeds to step 240 where at a subsequent point the access request is re-performed by reissuing the access request, this time specifying the remapped cache index, in order to initiate a cache lookup at step 245. In addition, the physical address information can also be provided at this point, since it will be available within the relevant entry of the tracking circuitry 45. Alternatively, it may be decided that is appropriate for the TLB 35 to re-perform the translation, in which case that translation can be performed in parallel with the lookup performed in the cache at step 245.

However, due to the removal of the aliasing condition that resulted from remapping the cache index at step 235, then as indicated by step 250, the remap condition will no longer be present and hence the access request can be processed normally. In particular, due to the remapping, it can be ensured that when a second program thread is performing a load access operation in respect of a specified physical address that is the subject of an exclusive operation by the first program thread, both program threads are forced to use the same cache index, and accordingly access the same cache line within the cache, avoiding any eviction of the data from the cache to handle the load operation from the second program thread, and hence ensuring that the exclusive operation can continue.

Figure 4:
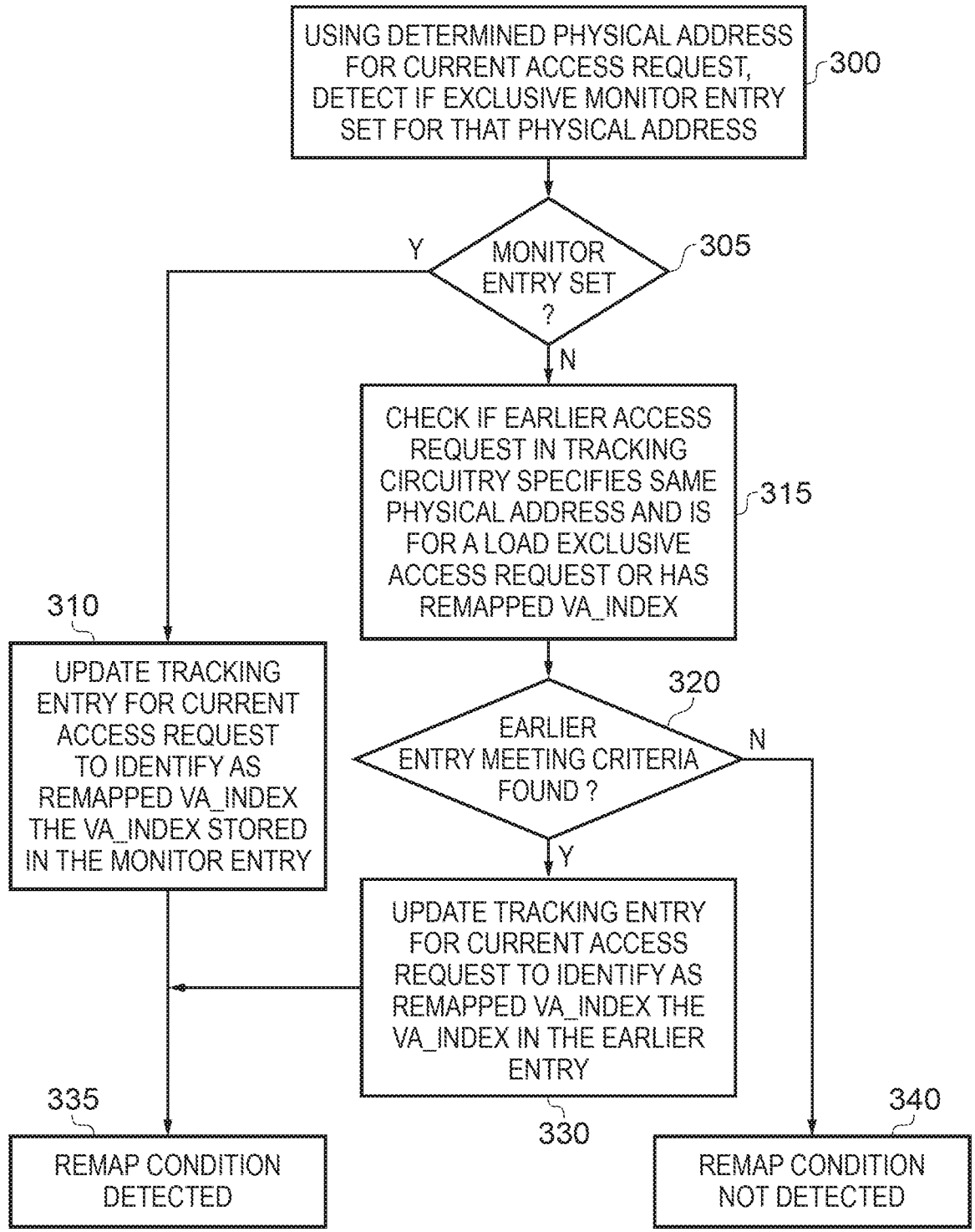
FIG. 4 is a flow diagram illustrating steps that may be performed to implement the remap condition check of FIG. 3A in one example arrangement.

FIG. 4 is a flow diagram illustrating in more detail the steps performed in order to implement the remap condition check of step 220 of FIG. 3A. At step 300, using the determined physical address for the current access request, it is detected if an exclusive monitor entry is set for that physical address. It is then determined at step 305 whether the monitor entry was set, and if so the process proceeds to step 310 where the relevant tracking entry for the current access request is updated in order to identify as a remapped cache index the cache index that is stored in the relevant set monitor entry. Thereafter, the process proceeds to step 335, where it is noted that the remap condition has been detected.

If at step 305 it is determined that there is not a set monitor entry for the relevant physical address, then at step 315 the remap handling circuitry 50 checks, with reference to the tracking circuitry 45, whether there is an earlier access request that specifies the same physical address and is either for a load exclusive access request or is an entry that has a remapped cache index.

At step 320, if such an earlier entry is found, then the process proceeds to step 330 where the tracking entry for the current access request is updated to identify as the remapped cache index the cache index in the relevant identified earlier entry, whereafter the process proceeds to step 335. Otherwise, if no such earlier entry is found at step 320 then the process proceeds to step 340 where it is determined that the remap condition has not been detected.

Figure 5:
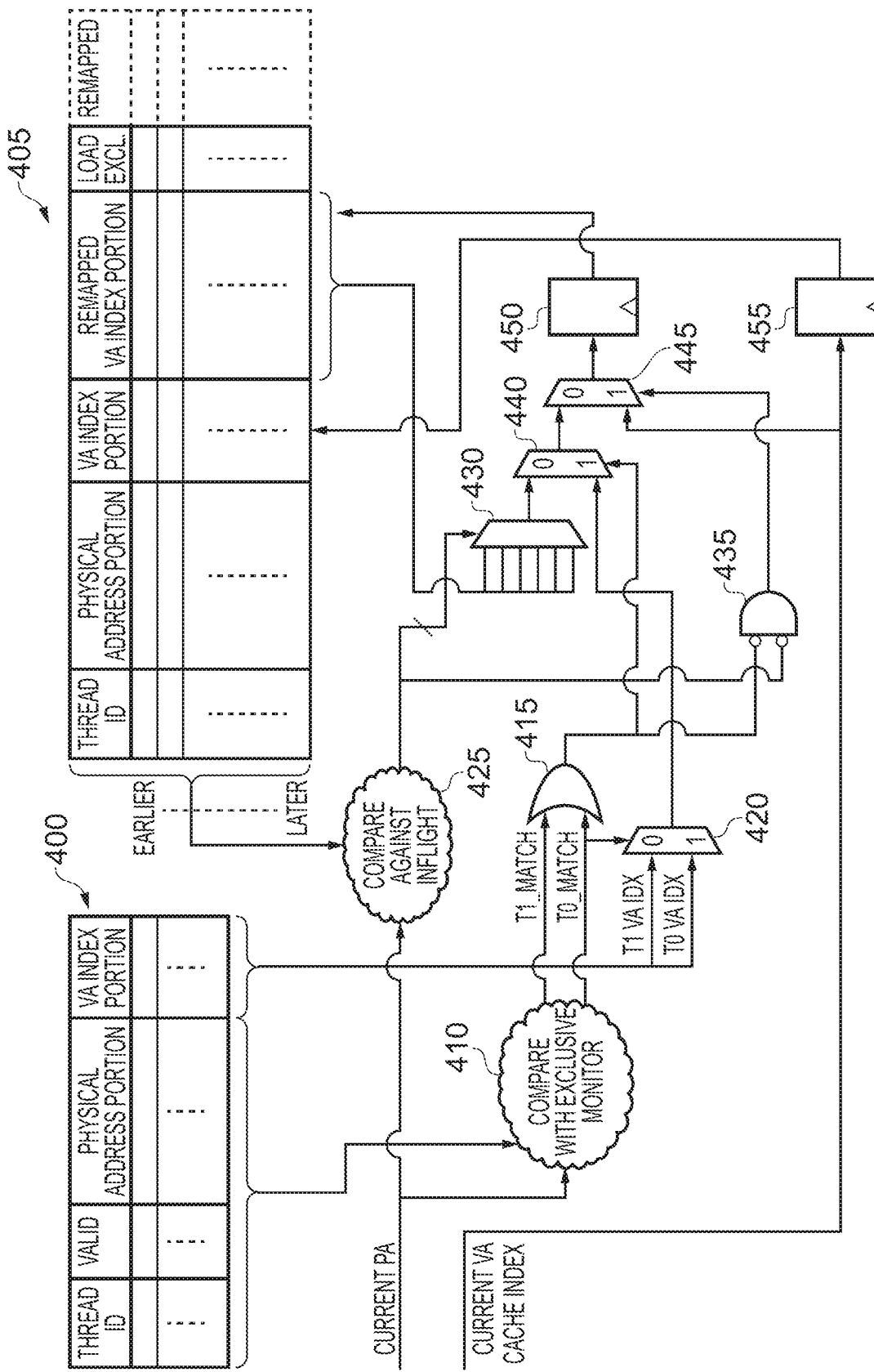
FIG. 5 is a diagram illustrating components that may be provided in one example configuration to implement the remap handling circuitry of FIG. 1.

FIG. 5 is a diagram illustrating in more detail components that may be provided within the remap handling circuitry 50 in order to perform the remap condition check discussed with reference to FIG. 4. As shown in FIG. 5, the remap handling circuitry 50 has access to the exclusive monitor entries 400 and the inflight access request tracking entries 405. In this example, each entry in the exclusive monitor storage has a number of fields, including a field to indicate the thread identifier, a valid field which is set to identify whether the entry is valid, a physical address field to store at least a portion of the physical address, and a cache index field to store at least a portion of the cache index. In one example arrangement, the entire physical address can be stored in the physical address portion, but in another example arrangement only a portion of the physical address needs to be stored, for example all of the bits down to bit 6 assuming the example discussed earlier with reference to FIG. 2A. Similarly, the cache index portion may store the entire cache index. However, alternatively it may be arranged to only store the bits in the field 122 shown in FIG. 2B, i.e. the aliasing bits that can differ between different virtual addresses. Hence, in one particular example, it may store bits 13 and 12 of the cache index.

As shown in FIG. 5, in one example implementation the tracking circuitry 45 may include a plurality of entries 405, where each entry has a field to identify the thread ID, a field to identify at least a portion of the physical address, a field to identify at least a portion of the cache index, a field to identify any remapped cache index portion, and a field to identify whether the associated access operation is a load exclusive operation. If desired, an additional field may be provided to identify if the entry has had its cache index remapped or not. Alternatively, this field may be omitted, and instead that can be determined by comparing the cache index portion field with the remapped cache index portion field to determine if they are different. With regard to the physical address and the cache index portion, the same portions of the physical address and the cache index can be stored as discussed earlier with reference to the exclusive monitor storage entries 400.

As shown in FIG. 5, a processing stage 410 is provided within the remap handling circuitry 50 that, on receiving a physical address for a current access request, can compare that physical address with the physical address information stored in any valid entries of the exclusive monitor storage. Whilst in one example the comparison may be restricted to situations where the thread ID of the current access request differs to the thread ID of any set entry in the exclusive monitor storage 400, in an alternative example the check can be performed irrespective of the thread ID, hence avoiding the need to perform a thread ID comparison. Whilst this may cause more remapping than is strictly necessary to deal with the earlier mentioned live-lock problem, it can provide efficiency benefits in the accessing of the cache. The output of the stage 410 is a number of match signals, one match signal being associated with each thread. In an example where there are merely two threads, namely threads 0 and 1, it will be seen that there will be a match signal output for thread 0 and for thread 1. These signals are subjected to a logical OR operation by the OR gate 415 in order to generate an output signal passed to the AND gate 435, that signal being inverted prior to receipt by the AND gate 435.

In addition, the cache indexes for thread 0 and thread 1 are input to the multiplexer 420 whose output is driven by the value of the thread 0 match signal. Hence, in this example it is assumed that the exclusive monitor storage has a single entry for each thread, and hence there will be a single cache index to output for each thread. Alternatively, the exclusive monitor storage may be able to store multiple entries for each thread, but in that event only the relevant cache index portions, i.e. those associated with the physical address that is being matched against in stage 410, are output to the multiplexer 420. The output from the multiplexer 420 is then forwarded to the multiplexer 440.

A further stage 425 compares the current physical address with the physical address portions within the various entries 405 maintained by the inflight access request tracking circuitry. If any match is detected, then a logic 1 value is output over the path to the AND gate 435 where it is inverted prior to input to the AND gate 435. Further, a multi-bit signal is output to control the multiplexer 430, to identify which entry the match was detected for. The remapped cache indexes for each of the entries can then be forwarded as inputs to the multiplexer 430, so that the appropriate remapped cache index can be output to the multiplexer 440.

The multiplexer 440 is controlled by the output from the OR gate 415, and hence will preferentially select the cache index from the exclusive monitor storage over any cache index from the inflight tracking circuitry. However, whenever a match has been detected in either the exclusive monitor storage or the inflight tracking circuitry, it will be seen that a remapped cache index will be output from the multiplexer 440 to the multiplexer 445. The other input of the multiplexer 445 is the original virtual address cache index. The multiplexer 445 is controlled by the output from the AND gate 435. In combination with the negated inputs, it will be seen that the AND gate 435 effectively implements a NOR gate functionality. Hence, whenever the output from the OR gate 415 is at a logic 1 value or the output from the logic 425 is at a logic 1 value, the upper input to the multiplexer 445 will be selected to store in the storage element 450, i.e. the remapped cache index will be selected. Only if both the output from the OR gate 415 and the output from the logic 425 are at a logic 0 level will the multiplexer 445 select the original cache index for storing in the storage element 450. The storage element 455 also stores the original cache index.

The relevant entry within the inflight access request tracking circuitry associated with the current access request can then be updated as shown in FIG. 5. In particular, the original index portion and the remapped index portion fields will be populated by the outputs from the storage elements 455 and 450, respectively.

As a result, it can be seen how the remap handling circuitry 50 can detect presence of the remap condition, and in that event generate a remapped cache index. In the absence of the remap condition, both the original cache index portion and the remapped cache index portion will store the same cache index. This will indicate that no remapping has taken place.

FIGS. 6A to 6C illustrate various example remap triggers, by way of specific example. In the example of FIG. 6A it is assumed that the exclusive monitor entry 500 has a valid entry set for thread 0, where the physical address portion has a value A and the cache index has a value X. As shown by the entry 505, the tracking entry for the current access request identifies that that also has physical address of A, is associated with thread 1, but uses a different cache index Y. The remapped index portion may be empty initially, or alternatively may be set equal to the original cache index portion initially and hence may also provide the value Y. With regard to the load exclusive field, this is a "don't care" state for the sake of the current illustration, since it does not matter whether the current access request is a load exclusive access request or not.

As shown by the remapped entry 510, through application of the remap detection functionality of the remap handling circuitry 50, this will cause the entry to be updated so that the remapped cache index portion is set equal to the value X. As a result, when the current access request is re-performed, the same cache index will be used as is associated with the exclusive operation being performed by thread 0, as indicated by the valid entry 500 within the exclusive monitor storage.

The approach illustrated in FIG. 6A will identify situations where thread 1 is performing an access operation using a cache index that creates an aliasing condition with regard to an exclusive operation currently being performed by thread 0. However, as discussed with reference to FIG. 5, it is not necessary to perform the thread ID check, and the functionality shown in FIG. 6A could still be performed even if both thread IDs were the same, thereby avoiding the need to perform the thread ID checking process.

FIG. 6B illustrates an alternative/additional remap trigger that can be detected with reference to the contents of the inflight access request tracking circuitry 425. The entry 515 indicates the contents of a tracking entry for an earlier access request. In this case, no remapping has occurred, but the entry indicates that thread 0 will be performing a load exclusive operation when that access request is performed. At this stage it may or may not be the case that the exclusive monitor storage 40 has had an entry set in respect of this access request. The entry 520 then indicates a tracking entry for a later access request issued by thread 1, which is to the same physical address as indicated in the entry 515, but uses a different cache index Y. Initially, the remapped cache index may also be Y, and the state of the load exclusive field is not relevant. Under such a situation, the remap handling circuitry will determine that the later tracking entry should have its cache index remapped, as indicated by the updated entry 525. This ensures that the same cache index is used for this later access request, hence avoiding the potential live-lock issue with regard to the earlier load exclusive operation for thread 0.

As with the FIG. 6A example, the above check and remapping can occur even if the thread IDs are the same, hence avoiding the need to perform a thread ID check. Further, whilst the process illustrated in FIG. 6B can be limited to situations where the later tracking entry is tracking a load operation, alternatively the same remapping can be performed for both loads and stores, hence avoiding the need to distinguish between load and store operations. As mentioned earlier, performance benefits may still be realised by remapping store operations, even though such remapping is not strictly needed in order to deal with the live-lock issue for exclusive operations.

FIG. 6C illustrates a third example remap trigger. In this example, the earlier access request being tracked by the tracking entry 530 is not a load exclusive operation, but does indicate that a remapping of the cache index has taken place. This infers that there is some earlier load exclusive functionality associated with thread 0. Hence, if the later tracking entry has the form 535, it may be determined to perform a remapping in order to generate an updated entry 540. As with the example of FIG. 6B, it is not necessary to perform any thread ID checking to check that the thread IDs are different, and instead the same remapping can be performed even if the thread IDs are the same if desired, in order to avoid the thread ID check. Further, whilst the remapping may be limited to situations where the later entry relates to a load access request, alternatively the same remapping can be performed for loads and stores, to avoid the need to perform a check as to whether the later tracking entry relates to a load operation or a store operation.

In one example implementation, it is beneficial that, in situations where a load exclusive access request has its cache index remapped, the associated store exclusive access request also has its cache index remapped in the same way. This is illustrated schematically by the flow diagram of FIG. 7. In particular, if at step 560 it is determined that a load exclusive access request has had its cache index remapped, then in due course the same remapped cache index will also be associated with the subsequent store exclusive access request at step 570.

Figure 7:
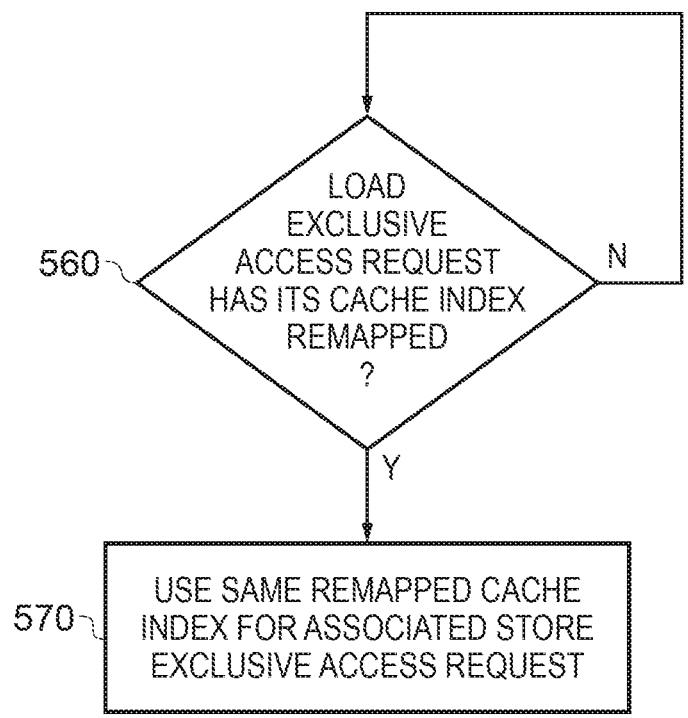
FIG. 7 is a flow diagram illustrating how the remapping of store exclusive access requests can be controlled in dependence on remapping performed for the corresponding load exclusive access request in one example arrangement.
Figure 8:
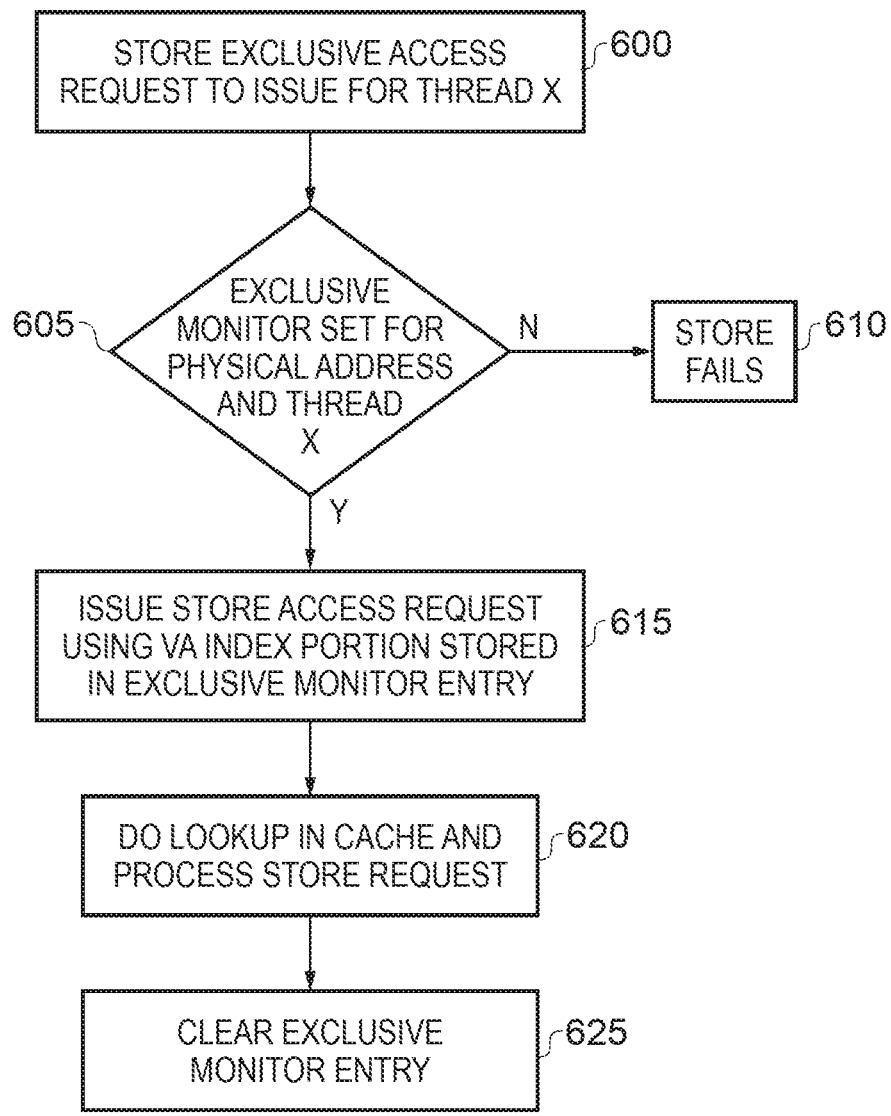
FIG. 8 is a flow diagram illustrating the handling of store exclusive access requests in one example arrangement.

There are a number of ways in which the functionality of FIG. 7 can be achieved. However, a simple and effective mechanism for achieving the functionality of FIG. 7 is shown by the flow diagram of FIG. 8. In particular, when it is determined that a store exclusive access request is to be issued for thread X at step 600, it is then determined at step 605 whether the exclusive monitor is set for the relevant physical address, and for thread X. If not, then in accordance with standard functionality, the exclusive store request must fail, as indicated by step 610.

However, if the exclusive monitor is set, then the store access request can merely be issued at step 615 using the cache index portion stored in the exclusive monitor entry. In particular, there is no need for the remap handling circuitry to perform any remapping at this stage, and instead the cache index can be used directly at step 615. As a result, at step 620 the lookup in the cache is performed using the same cache index as was associated with the corresponding load access request, and hence is processed in the normal manner. At step 625, the exclusive monitor entry is then cleared, as per the standard procedure when an exclusive store access request is performed.

From the above described examples, it will be appreciated that such examples provide an efficient mechanism for dealing with the potential live-lock scenario that can arise when exclusive operations are performed in a multi-threaded environment, where the multiple threads share access to the same cache, and the cache is arranged as a VIPT cache. In particular, in situations that may give rise to a live-lock scenario if not treated differently, a mechanism is provided to ensure that both threads use the same cache index, and hence identify the same entry within the cache. This avoids an eviction from the cache that might otherwise arise in order to service a load access request, that could in turn cause an exclusive operation being performed by another thread to terminate without completing. In particular, the technique forces a secondary access to the same physical address to use the same cache index as an ongoing exclusive operation. Hence, by such an approach, load operations are detected that hazard a virtual alias against an ongoing exclusive operation, and a remap operation is performed in respect of the conflicting operations such that the hazard is removed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to process a plurality of program threads to perform data processing operations on data, the operations identifying the data using virtual addresses, and the virtual addresses being mapped to physical addresses within a memory system;
a cache storage having a plurality of cache entries to store data, an aliasing condition existing when multiple virtual addresses map to a same physical address, and allocation of data into the cache storage being constrained to prevent multiple cache entries of the cache storage simultaneously storing data for the same physical address;
cache access circuitry, responsive to an access request specifying a virtual address, to utilise a cache index at least partially determined from the specified virtual address to identify at least one cache entry within the cache storage, and to detect whether a hit is present within said at least one cache entry by comparing a physical address portion associated with that cache entry with a tag portion of the physical address corresponding to the specified virtual address; and
remap handling circuitry, whilst a first program thread is in a process of performing an exclusive operation using a first virtual address to identify a specified physical address whose data is stored in the cache storage, to detect a remap condition when a second program thread issues a second program thread access request of at least one type that specifies a second virtual address that exhibits the aliasing condition with the first virtual address, and in a presence of the remap condition to remap the cache index at least partially determined from the second virtual address, so that the remapped cache index as then used by the cache access circuitry matches the cache index at least partially determined from the first virtual address.

2. An apparatus as claimed in claim 1, further comprising:
exclusive monitor storage circuitry having at least one monitor entry for each program thread that is able to perform exclusive operations, where a monitor entry is set for a program thread to identify when that program thread has an exclusive operation ongoing for a specified physical address identified by that monitor entry, and is cleared when the exclusive operation is completed or the data for the specified physical address is evicted from the cache storage.

3. An apparatus as claimed in claim 2, wherein the remapped cache index generated by the remap handling circuitry ensures that at least when the second program thread access request specifies a load operation, the cache access circuitry will detect a hit within the cache entry of the cache storage storing the data for the exclusive operation being performed by the first program thread, hence preventing the data in that cache entry being evicted and thus preventing an associated monitor entry being cleared.

4. An apparatus as claimed in claim 2, wherein the remap handling circuitry is arranged to detect the remap condition when the exclusive monitor storage circuitry has a set monitor entry for the first program thread and the specified physical address identified by that monitor entry is the physical address that the second virtual address maps to.

5. An apparatus as claimed in claim 4, wherein the set monitor entry further provides a cache index indication, and in the presence of the remap condition the remap handling circuitry is arranged to use the cache index indication to remap the cache index at least partially determined from the second virtual address.

6. An apparatus as claimed in claim 5, wherein the cache index indication identifies one or more bits of the cache index that differ between virtual addresses exhibiting the aliasing condition.

7. An apparatus as claimed in claim 4, further comprising:
inflight access request tracking circuitry having a tracking entry for each load access request that has been issued by the processing circuitry but has not yet completed, each tracking entry indicating whether a load access request identified therein is associated with an exclusive operation, and providing for the load access request identified therein an indication of the program thread, and an indication of the specified physical address identified by the virtual address; and
the remap handling circuitry is further arranged to detect the remap condition when the inflight access request tracking circuitry has a tracking entry for the first program thread identifying that the load access request identified therein is associated with an exclusive operation and for which the specified physical address is the physical address that the second virtual address maps to.

8. An apparatus as claimed in claim 7, wherein the tracking entry further provides a cache index indication for a virtual address specified by the load access request, and in the presence of the remap condition the remap handling circuitry is arranged to use the cache index indication to remap the cache index at least partially determined from the second virtual address.

9. An apparatus as claimed in claim 8, wherein the cache index indication identifies one or more bits of the cache index that differ between virtual addresses exhibiting the aliasing condition.

10. An apparatus as claimed in claim 8, wherein each tracking entry further comprises a remap field to identify when the cache index has been remapped for the access request being tracked by that entry.

11. An apparatus as claimed in claim 10, wherein the remap handling circuitry is further arranged to detect the remap condition when the inflight access request tracking circuitry has a tracking entry for the first program thread whose remap field identifies that the cache index has been remapped for the access request being tracked by that entry and for which the specified physical address is the physical address that the second virtual address maps to.

12. An apparatus as claimed in claim 7, wherein:
said at least one type of second program thread access request that the remap handling circuitry is arranged to detect the remap condition for further comprises store access requests; and
the inflight access request tracking circuitry further comprises a tracking entry for each store access request that has been issued by the processing circuitry but has not yet completed.

13. An apparatus as claimed in claim 7, wherein:
the remap handling circuitry is further arranged to detect presence of the remap condition when at least one further access request is issued that is associated with a physical address that is identified in a tracking entry of the tracking circuitry.

14. An apparatus as claimed in claim 13, wherein said at least one further access request comprises a load exclusive access request issued for any of the plurality of program threads.

15. An apparatus as claimed in claim 2, wherein when a store exclusive access request is issued and an associated monitor entry is set in the exclusive monitor storage circuitry, a cache index indication within that associated monitor entry is used to determine the cache index to be provided for the store exclusive access request.

16. An apparatus as claimed in claim 2, wherein the monitor entry is set for a program thread in response to processing of a load exclusive access request used to start the exclusive operation, and is cleared in response to processing of a store exclusive access request used to complete the exclusive operation.

17. An apparatus as claimed in claim 1, when said at least one type of second program thread access request that the remap handling circuitry is arranged to detect the remap condition for comprises at least load access requests.

18. An apparatus as claimed in claim 17, wherein said at least one type of second program thread access request that the remap handling circuitry is arranged to detect the remap condition for further comprises store access requests.

19. An apparatus as claimed in claim 1, wherein the exclusive operation is such that for the exclusive operation to complete it is required for the data at the specified physical address to remain within the cache storage throughout performance of the exclusive operation.

20. An apparatus as claimed in claim 1, wherein:
the cache index is determined by a specified number of bits of the virtual address.

21. An apparatus as claimed in claim 1, wherein when the second program thread access request is a load exclusive access request, and has its cache index remapped, the remap handling circuitry is arranged to also associate a same remapped cache index with the corresponding store exclusive access request issued by the second program thread.

22. A method of handling access requests in an apparatus comprising:
employing processing circuitry to process a plurality of program threads to perform data processing operations on data, the operations identifying the data using virtual addresses, and the virtual addresses being mapped to physical addresses within a memory system;
providing a cache storage having a plurality of cache entries to store data, an aliasing condition existing when multiple virtual addresses map to the same physical address, and allocation of data into the cache storage being constrained to prevent multiple cache entries of the cache storage simultaneously storing data for a same physical address;
responsive to an access request specifying a virtual address, utilising a cache index at least partially determined from the specified virtual address to identify at least one cache entry within the cache storage, and detecting whether a hit is present within said at least one cache entry by comparing a physical address portion associated with that cache entry with a tag portion of the physical address corresponding to the specified virtual address; and
whilst a first program thread is in a process of performing an exclusive operation using a first virtual address to identify a specified physical address whose data is stored in the cache storage, detecting a remap condition when a second program thread issues a second program thread access request of at least one type that specifies a second virtual address that exhibits the aliasing condition with the first virtual address; and
in a presence of the remap condition, remapping the cache index at least partially determined from the second virtual address, so that the remapped cache index as then used to access the cache storage matches the cache index at least partially determined from the first virtual address.

23. An apparatus comprising:
processing means for processing a plurality of program threads to perform data processing operations on data, the operations identifying the data using virtual addresses, and the virtual addresses being mapped to physical addresses within a memory system;
cache storage means having a plurality of cache entries for storing data, an aliasing condition existing when multiple virtual addresses map to a same physical address, and allocation of data into the cache storage means being constrained to prevent multiple cache entries of the cache storage means simultaneously storing data for the same physical address;
cache access means for utilising, responsive to an access request specifying a virtual address, a cache index at least partially determined from the specified virtual address to identify at least one cache entry within the cache storage means, and for detecting whether a hit is present within said at least one cache entry by comparing a physical address portion associated with that cache entry with a tag portion of the physical address corresponding to the specified virtual address; and
remap handling means for detecting a remap condition, whilst a first program thread is in a process of performing an exclusive operation using a first virtual address to identify a specified physical address whose data is stored in the cache storage means, when a second program thread issues a second program thread access request of at least one type that specifies a second virtual address that exhibits the aliasing condition with the first virtual address, and in a presence of the remap condition for remapping the cache index at least partially determined from the second virtual address, so that the remapped cache index as then used by the cache access means matches the cache index at least partially determined from the first virtual address.

* * * * *